S. E. FOSTER.
Vehicle Spring.
No. 165,441. Patented July 13, 1875.
FIG. I.
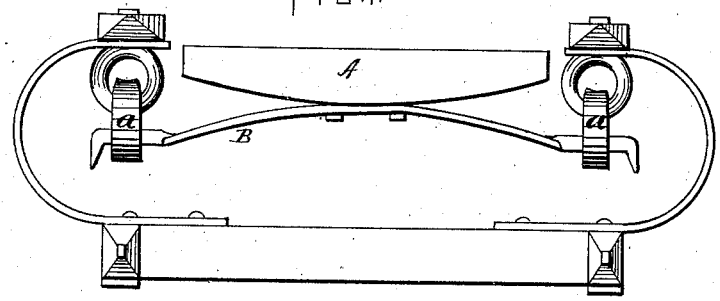
FIG. II.
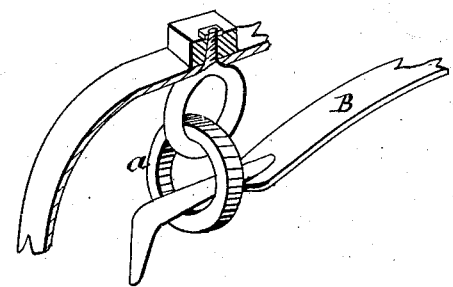
WITNESSES.
F. B. Townsend,
James Stevenson.
INVENTOR
Stephen E. Foster
per attys.
A. H. Evans & Co.

UNITED STATES PATENT OFFICE

STEPHEN E. FOSTER, OF MINNEAPOLIS, MINNESOTA.

IMPROVEMENT IN VEHICLE-SPRINGS.

Specification forming part of Letters Patent No. 165,441, dated July 13, 1875; application filed May 21, 1875.

*To all whom it may concern:*

Be it known that I, STEPHEN E. FOSTER, of Minneapolis, Minnesota, have invented certain new and useful Improvements in Springs for Vehicles, of which the following is a full, clear, and exact description, reference being had to the accompanying drawings, making a part of this description, in which—

Figure 1 is an end view of a vehicle-body hung with my device. Fig. 2 is an enlarged view of one part of the spring.

My improvement relates to springs for suspending vehicle-bodies; and it consists in the combination of devices hereinafter described and claimed, and is an improvement on my Patent No. 154,469, dated August 25, 1874.

To enable others skilled in the art to make and use my invention, I will proceed to describe the exact manner in which I have carried it out.

In my former patent the bars on which the body of the vehicle rested, and which were connected by hooks to the rubber rings, were made rigid, thus making the vehicle depend on the rings and not on the bars for elasticity. To overcome this difficulty is the object of my present improvement.

In the drawings A, represents the body of a vehicle, resting upon a semi-elliptic spring or spring-hook, B, over the ends of which are passed the rubber rings $a$, thus securing a more easy motion; heavy jolts from any direction being broken by the yielding of one spring or the other, and the running-gear subjected to far less strain than heretofore. By this combination the strength of the rubber rings is greatly increased, while the wear of the same is much reduced.

Having thus described my invention, what I claim as new, and desire to secure by Letters Patent, is—

In combination with the rubber spring $a$, the semi-elliptical spring-hooks B, substantially as and for the purpose set forth.

STEPHEN E. FOSTER.

Witnesses:
 VERNON BELL,
 ARTHUR WALES.